United States Patent
Lee et al.

(10) Patent No.: US 11,024,926 B2
(45) Date of Patent: Jun. 1, 2021

(54) LEADTAB ASSEMBLY AND BATTERY CELL HAVING THE SAME

(71) Applicants: Hyundai Motor Company, Seoul (KR); Kia Motors Corporation, Seoul (KR)

(72) Inventors: Sang-Joon Lee, Anyang-si (KR); Dong-Hui Kim, Suwon-si (KR); Sung-Min Choi, Gunpo-si (KR); Kyo-Min Shin, Hwaseong-si (KR); Sung-Hoon Lim, Hwaseong-si (KR); Seung-Ho Ahn, Hanam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 252 days.

(21) Appl. No.: 16/144,907

(22) Filed: Sep. 27, 2018

(65) Prior Publication Data
US 2019/0267602 A1 Aug. 29, 2019

(30) Foreign Application Priority Data
Feb. 27, 2018 (KR) .................... 10-2018-0023701

(51) Int. Cl.
*H01M 2/26* (2006.01)
*H01M 10/052* (2010.01)
(Continued)

(52) U.S. Cl.
CPC ....... *H01M 50/538* (2021.01); *H01M 10/052* (2013.01); *H01M 10/647* (2015.04);
(Continued)

(58) Field of Classification Search
CPC .......... H01M 2/263; H01M 2/22; H01M 2/26; H01M 2/20; H01M 10/647; H01M 2/0275; H01M 2/30; H01M 10/052; H01M 2/34
See application file for complete search history.

(56) References Cited

U.S. PATENT DOCUMENTS

| 2004/0126650 | A1* | 7/2004 | Kim | .................... H01M 2/0426 429/61 |
| 2011/0123844 | A1* | 5/2011 | Bhardwaj | ........... H01M 10/052 429/56 |

(Continued)

FOREIGN PATENT DOCUMENTS

KR 10-2017-004491 A 4/2017

OTHER PUBLICATIONS

European Search Report, dated Dec. 21, 2018; for European Patent Application No. 18201176.7.

*Primary Examiner* — Lisa S Park
(74) *Attorney, Agent, or Firm* — Morgan, Lewis & Bockius LLP

(57) ABSTRACT

A leadtab assembly may include an electrode non-coating portion having a plurality of stacked electrodes collected inside a battery cell, a leadtab for forming an electrical path to the outside of the battery cell, and a bonding portion for mutually bonding the electrode non-coating portion and the leadtab, wherein a cutting prevention portion is elastically deformed by the force applied to the electrode non-coating portion as the electrode is expanded at the bonding point located between the bonding portion and the leadtab.

15 Claims, 6 Drawing Sheets

(51) Int. Cl.
   *H01M 10/647*   (2014.01)
   *H01M 2/02*     (2006.01)
   *H01M 2/30*     (2006.01)
   *H01M 50/538*   (2021.01)
   *H01M 50/50*    (2021.01)
   *H01M 50/116*   (2021.01)
   *H01M 50/528*   (2021.01)
   *H01M 50/531*   (2021.01)
   *H01M 50/543*   (2021.01)

(52) U.S. Cl.
   CPC ......... *H01M 50/116* (2021.01); *H01M 50/50* (2021.01); *H01M 50/528* (2021.01); *H01M 50/531* (2021.01); *H01M 50/543* (2021.01)

(56) References Cited

U.S. PATENT DOCUMENTS

2011/0244312 A1* 10/2011 Tani .................. H01M 2/26
                                                429/163
2017/0077503 A1*  3/2017 Erickson ............ H01M 4/62

\* cited by examiner

LEADTAB ASSEMBLY AND BATTERY CELL HAVING THE SAME

CROSS-REFERENCE TO RELATED APPLICATIONS

The present application claims priority to Korean Patent Application No. 10-2018-0023701, filed on Feb. 27, 2018, the entire contents of which is incorporated herein for all purposes by this reference.

BACKGROUND OF THE DISCLOSURE

Field of the Disclosure

The present invention relates to a leadtab assembly and a battery cell having the same, and more particularly, to a leadtab assembly and a battery cell having the same, which have a cutting prevention portion that an elastic structure is deformed depending upon electrode expansion at the bonding portion that mutually bonds (or fuses) an electrode non-coating portion inside the battery cell and a leadtab extending to the outside of the battery cell, thus preventing bonding breakage.

Description of Related Art

Generally, unlike a non-rechargeable primary battery, a rechargeable and dischargeable secondary battery is actively researched for the development of a high-tech field, such as a digital camera, a cellular phone, a laptop computer, a power tool, an electric bicycle, an electric vehicle, a hybrid vehicle, and a high-capacity power storage device.

Since a lithium secondary battery can have a high energy density per device weight and can be rapidly charged compared to other secondary batteries, such as a conventional lead storage battery, a nickel-cadmium battery, a nickel-hydrogen battery, and a nickel-zinc battery, the usage thereof is actively increased.

The lithium secondary battery has an operation voltage of 3.6V or more and is used as a power source of a portable electronic device, or connects a plurality of batteries in serial or in parallel to be used in a high-output electric vehicle, a hybrid vehicle, a power tool, an electric bicycle, a power storage device, an UPS, etc.

The lithium secondary battery may be produced in the shape of a pouch cell. The pouch cell has the configuration including a jelly roll, an anode leadtab, a cathode leadtab, and a pouch.

By the way, if silicone series are used as a cathode active material, the battery capacity is increased but there is the disadvantage that the volume of the cathode is expanded upon charging.

This can cause the phenomenon that as an electrode increases in the up/down/left/right/thickness directions relative to an original thickness, unlike the leadtab relatively having rigidity, the electrode non-coating portion receives the force to be bent and to be broken in severe cases. That is, the tension of the electrode non-coating portion located at the uppermost and the lowermost end portions thereof has already been engaged at the cathode in the stacked state in the jelly roll, such that the electrode non-coating portion may be easily cut as the volume of the cathode is expanded.

Accordingly, in the battery structure having a plurality of electrodes stacked, a current path is cut off due to breakage of the electrode non-coating portion, such that not only the capacity of the battery cell is reduced but also the resistance is increased.

Accordingly, it is necessary to prevent the breakage phenomenon of the electrode non-coating portion due to the electrode expansion in the pouch cell to prevent deterioration in performance of the battery cell.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a leadtab assembly and a battery cell having the same, which have a cutting prevention portion that an elastic structure is deformed depending upon electrode expansion at the bonding portion that mutually bonds (or fuses) an electrode non-coating portion inside the battery cell and a leadtab extending to the outside of the battery cell, thus preventing bonding breakage.

A leadtab assembly In accordance with various exemplary embodiments of the present invention may include an electrode non-coating portion having a plurality of stacked electrodes collected inside a battery cell, a leadtab for forming an electrical path to the outside of the battery cell, and a bonding portion for mutually bonding the electrode non-coating portion and the leadtab; and further include a cutting prevention portion elastically deformed by the force applied to the electrode non-coating portion as the electrode is expanded at the bonding point located between the bonding portion and the leadtab.

The bonding portion may be formed by extending the electrode non-coating portion.

The cutting prevention portion may include an arched bending portion formed in an arched structure which is elastically deformed by the force applied to the electrode non-coating portion as the electrode is expanded; and an insulation portion located under the arch of the arched bending portion to adjust the degree of elastic deformation of the arched structure of the arched bending portion.

The arched bending portion may be the shape of thinner thickness and wider width than the leadtab.

The arched bending portion may include a bonding extension portion for bonding both end portions of the arched structure.

The arched bending portion may be injection-molded into an integral structure with the leadtab.

The insulation portion may be polymer material.

The leadtab may include a sealant of polymer material united to one side thereof for sealing the battery cell.

The electrode non-coating portion may be a cathode non-coating portion using the active material of silicon series.

Furthermore, a battery cell In accordance with various exemplary embodiments of the present invention may include an electrode assembly assembled by separating an actively coated anode layer and an actively coated cathode layer by a separation film layer, a first electrode portion and a second electrode portion for forming an electrical path with a jelly roll, and a pouch for receiving by folding the jelly roll with a flexible sheet; and at least one of the first electrode portion and the second electrode portion may be a leadtab assembly for preventing bonding breakage through elastic deformation depending upon electrode expansion.

The electrode assembly may be the jelly roll for forming a multi-layered structure wound while separating the anode layer, the cathode layer, and the separation film layer.

The present invention may include the cutting prevention portion that the elastic structure is deformed depending upon the electrode expansion at the bonding portion that mutually bonds (or fuses) the electrode non-coating portion inside the battery cell and the leadtab extending to the outside of the battery cell, thus preventing the bonding breakage.

Furthermore, the present invention can prevent deformation and breakage of the electrode non-coating portion of the jelly roll when the volume of the cathode having the active material of silicone series coated is expanded.

Furthermore, the present invention can prevent deterioration in performance of the battery cell, such as the decrement in capacity and the increment in an internal resistance, due to the breakage of the electrode non-coating portion of the jelly roll.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
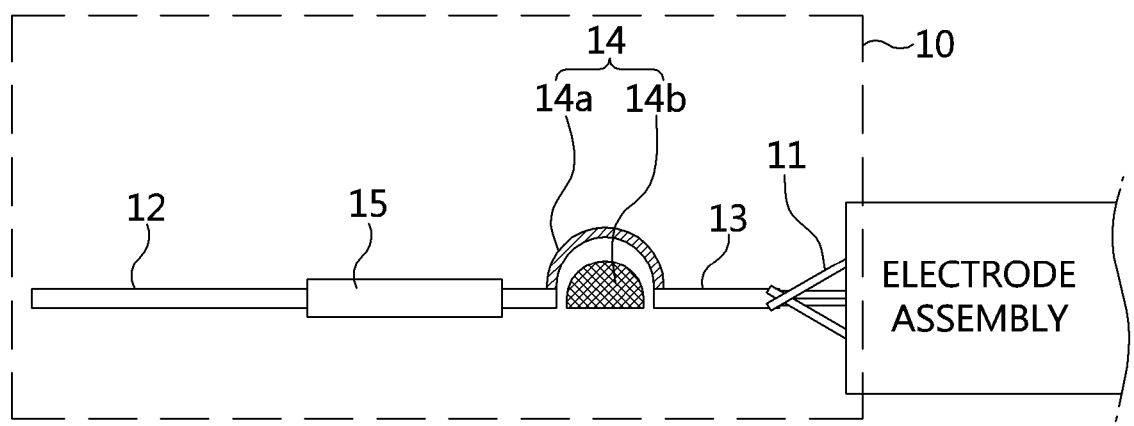
FIG. 1 is a diagram illustrating a leadtab assembly in accordance with various exemplary embodiments of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings. However, in the following description and the accompanying drawings, a detailed description of well-known functions or configurations that can obscure the subject of the present invention will be omitted. Furthermore, it should be noted that the same components are denoted by the same reference numerals as much as possible throughout the entire drawings.

It should be understood that the terms or the words used in the specification and claims hereinafter described should not be construed as limited to general or dictionary meanings, but interpreted based on the meanings and concepts corresponding to technical aspects of the present invention on the basis of the principle that the inventor is allowed to define terms appropriately for the best explanation.

Accordingly, the exemplary embodiments described in the present specification and the configurations illustrated in the drawings are merely the most exemplary an exemplary embodiment of the present invention, and not intended to represent all of the technical spirits of the present invention. Therefore, it should be understood that various equivalents and modifications may be substituted for those at the time of filing the present application.

Some elements are exaggerated, omitted, or schematically illustrated in the accompanying drawings, and actual sizes of respective elements are not necessarily represented in the drawings. The present invention is not limited by relative sizes or distances illustrated in the accompanying drawings.

In the entire specification, when a certain portion "includes" a certain component, this means that the other components are excluded, but may be further included unless specially described otherwise. In addition, when a certain portion is "connected" to another portion, it may be "directly connected" or "electrically connected" with other elements interposed therebetween.

The singular forms include the plural forms unless the context clearly indicates otherwise. It will be understood that the terms "comprises" or "includes" specify the presence of features, integers, steps, operations, elements, components, or a combination thereof described in the present specification, but do not preclude the presence or addition of one or more other features, integers, steps, operations, elements, components, or a combination thereof.

Hereinafter, various exemplary embodiments of the present invention will be described in detail with reference to the accompanying drawings so that those skilled in the art may easily practice the present invention. However, the present invention may be implemented in various different forms, and is not limited to the exemplary embodiments described herein. And, in the drawings, to clearly describe the present invention, portions which are not related to the description of the present invention are omitted, and similar portions are denoted by similar reference numerals in the entire specification.

Hereinafter, the exemplary embodiments of the present invention will be described with reference to the accompanying drawings.

Figure 2A:
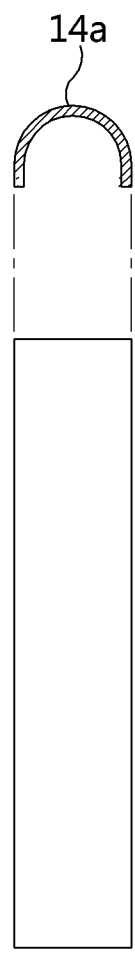
FIG. 2A, FIG. 2B and FIG. 2C are diagrams illustrating the shape of an arched bending portion.
Figure 2B:
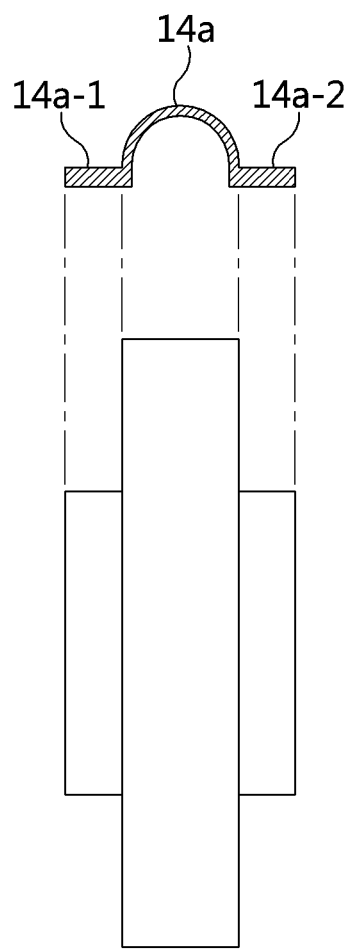
Figure 2C:
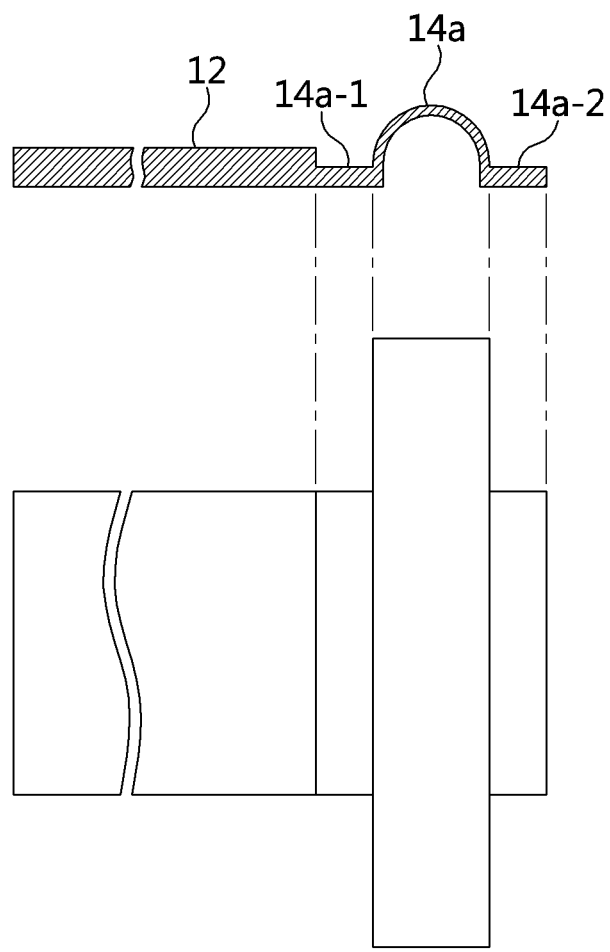

FIG. 1 is a diagram illustrating a leadtab assembly in accordance with various exemplary embodiments of the present invention, and FIG. 2A, FIG. 2B and FIG. 2C are diagrams illustrating the shape of an arched bending portion.

As illustrated in FIG. 1, a leadtab assembly 10 In accordance with various exemplary embodiments of the present invention includes a cutting prevention portion 14 for preventing bonding breakage through elastic deformation by the force applied to an electrode non-coating portion 11 depending upon electrode expansion when the electrode non-coating portion 11 having a plurality of stacked electrodes collected and a leadtab 12 for forming an electrical path to the outside of a battery cell are mutually bonded (or fused) at a bonding portion 13.

The bonding portion 13 may be separate configuration from the electrode non-coating portion 11, or configuration having the electrode non-coating portion 11 extended and formed. Herein, the case that the bonding portion 13 is formed as the separate configuration from the electrode non-coating portion 11 will be described.

The cutting prevention portion 14 is located between the leadtab 12 and the bonding portion 13, but may be also located between the bonding portion 13 and the electrode non-coating portion 11. Thus, the cutting prevention portion 14 may be located on at least one bonding point which is located between the leadtab 12, the bonding portion 13, and the electrode non-coating portion 11. However, herein, for convenience of explanation, the case that the cutting prevention portion 14 is located between the leadtab 12 and the bonding portion 13 will be described.

And, the leadtab 12 is formed in a plate shape having a predetermined thickness, and a sealant 15 of polymer material for sealing the battery cell is united to one side thereof. The leadtab 12 may be subject to a surface treatment or a hydrophilic polymer coating treatment, etc, at the uniting location of the sealant 15 to enhance the uniting force with the sealant 15 and to minimize the uniting thickness.

Furthermore, the leadtab 12 may be copper (Cu) or nickel (Ni) in a cathode, and aluminum (Al) in an anode.

Herein, the area where the bonding breakage mainly occurs depending upon the electrode expansion (that is, a cutting weakness area) is the bonding area between the electrode non-coating portion 11 and the bonding portion 13. Thus, the cutting prevention portion 14 prevents the breakage of the electrode non-coating portion 11 depending upon the electrode expansion in most cases.

As described above, the cutting prevention portion 14, as a predetermined elastic structure, includes an arched bending portion 14a mutually connecting the leadtab 12 and the bonding portion 13 in an arched structure, and an insulation portion 14b located under the arch of the arched bending portion 14a.

Firstly, the arched bending portion 14a bonds the leadtab 12 and the bonding portion 13 at each of both end portions of the arched structure so that the elastic bending deformation of the arched structure can occur in an optimal state. Herein, an ultrasonic fusing (welding) method is used as the bonding method. That is, one end portion of the arched structure bonded to the leadtab 12 functions as supporting the bending deformation of the arched structure, and the other end portion of the arched structure bonded to the bonding portion 13 functions as applying the force causing the bending deformation of the arched structure.

Furthermore, the arched bending portion 14a is formed in the shape having thinner thickness and wider width than the leadtab 12 or the bonding portion 13 so that the elastic bending deformation of the arched structure is possible when the force generated by the electrode expansion is delivered through the bonding portion 13. This is to ultimately provide the same current flow path as that of the leadtab 12 or the bonding portion 13 by reducing the current flow path as the arched bending portion 14a becomes thinner than the leadtab 12 or the bonding portion 13 to compensate for the increment in the resistance and thus forming to be wider than the leadtab 12 or the bonding portion 13.

Thus, the arched bending portion 14a can provide the same current flow path as that of the leadtab 12 or the bonding portion 13 while the bending deformation of the arched structure depending upon the electrode expansion is possible.

Meanwhile, the leadtab 12 and the electrode non-coating portion 11 are formed to have the same thickness and width. Thus, the leadtab assembly 10 includes two regions having different thickness and width.

Referring to FIG. 2A, FIG. 2B and FIG. 2C, the arched bending portion 14a may be variously implemented, such as the structure forming only the arched structure (referring to FIG. 2A), the structure provided with bonding extension portions 14a-1, 14a-2 at both end portions of the arched structure (referring to FIG. 2B), and the integral structure with the leadtab 12 (referring to FIG. 2C).

Thus, the arched bending portion 14a may be formed only in the arched structure as in FIG. 2A, but as in FIG. 2B, formed with the bonding extension portions 14a-1, 14a-2 for bonding the leadtab 12 and the bonding portion 13 at both end portions of the arched structure. Furthermore, the arched bending portion 14a may be injection-molded into the integral structure with the leadtab 12 as in FIG. 2C.

And, the arched bending portion 14a may be of the same or dissimilar metal as that of the leadtab 12. In the dissimilar metal, a metal bonding area may be added to cause contact resistance, such that the thickness and the width thereof may be determined considering the contact resistance.

In an exemplary embodiment of the present invention, the bonding extension portions 14a-1 and 14a-2 are thinner than the leadtab 12 as shown in FIG. 2C.

In an exemplary embodiment of the present invention, the insulation portion 14b is in a semicircular shape.

Next, the insulation portion 14b prevents excessive bending deformation of the arched bending portion 14a due to external factors (e.g., vibration, impact, etc.). This is because the excessive bending deformation of the arched bending portion 14a exceeds the elastic limit to prevent the breakage of the arched bending portion 14a or the failure to recover the original arched structure. That is, the insulation portion 14b is located under the arched structure to adjust the amount of elastic deformation of the arched structure.

The insulation portion 14b can absorb the force delivered by the arched bending portion 14a through the shape deformation when being contacted by the bending deformation of the arched bending portion 14a, and may be implemented by polymer material facilitating recovery of the arched structure of the arched bending portion 14a through recovery of the shape deformation.

Figure 3:
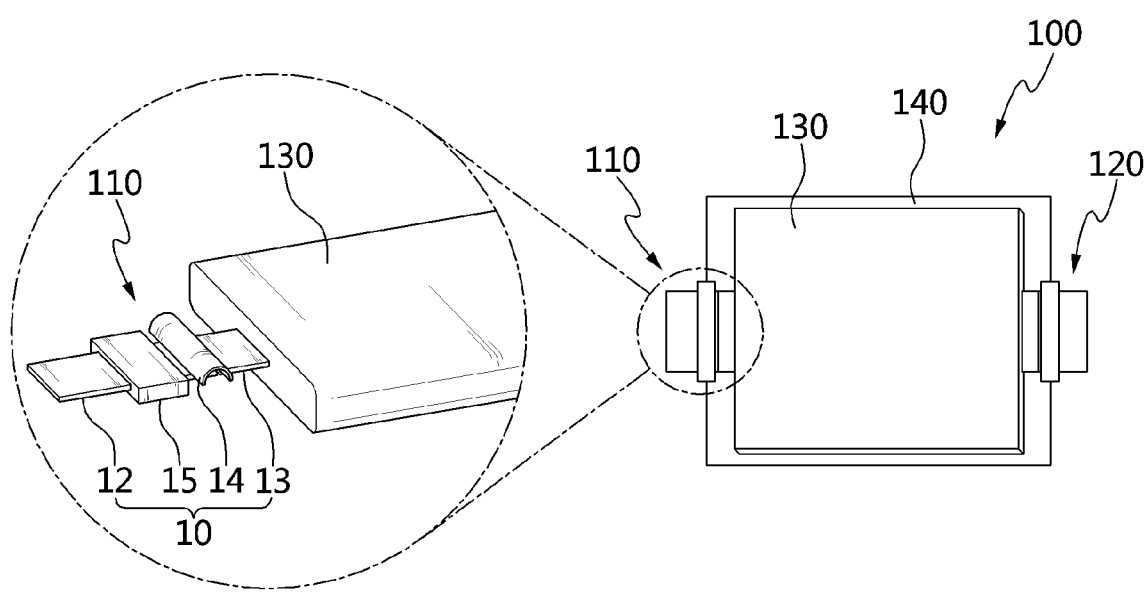
FIG. 3 is a diagram illustrating a battery cell having the leadtab assembly In accordance with various exemplary embodiments of the present invention.

FIG. 3 is a diagram illustrating a battery cell having the leadtab assembly in accordance with various exemplary embodiments of the present invention.

As illustrated in FIG. 3, an exemplary embodiment that a battery cell 100 having the leadtab assembly in accordance with various exemplary embodiments of the present invention is implemented by a pouch cell will be described.

The battery cell 100 includes a first electrode portion 110, a second electrode portion 120, an electrode assembly 130, and a pouch 140.

The first electrode portion 110 and the second electrode portion 120, as illustrated in FIG. 2, may be formed at left/right sides of the battery cell 100, respectively. In the instant case, the first electrode portion 110 and the second electrode portion 120 may be located in a straight line or diagonally to each other. Furthermore, all of the first electrode portion 110 and the second electrode portion 120 may be formed at one side of left/right sides of the battery cell 100.

The electrode assembly 130 is the structure assembled by separating an actively coated anode layer and an actively coated cathode layer by a separation film layer. In the present time, the electrode assembly 130 may be a jelly roll that forms a multi-layered structure spirally wound while separating the anode layer, the cathode layer, and the separation film layer.

And, the actively coated anode layer and cathode layer are connected to the electrode non-coating portion protruded to the outside of the electrode assembly 130 in the non-coating state. In the present time, the electrode non-coating portion is connected to the leadtab 12 through the bonding portion 13 to form an electrical path. The electrode non-coating portion is formed to be greater than the separation film layer and protruded.

And, the electrode assembly 130 is received in the flexible pouch 140 formed by folding a flexible sheet.

Herein, the anode layer and the cathode layer are coated with slurry including an active material, a binder, a conductive agent, etc. on the metal collector. Material of the active material utilizes carbon series such as graphite, and can use silicon series having a high energy density for high capacity.

If silicon is used as the active material of the cathode layer, the capacity is increased while the volume of the cathode layer may be expanded. The cathode layer may be expanded to a maximum of four times as much as the original particles in volume upon charging.

Meanwhile, at least one of the first electrode portion 110 and the second electrode portion 120 may be applied with the leadtab assembly 10 described in FIG. 1. By the way, if silicon is used as the active material in the case that the first electrode portion 110 is a cathode and the second electrode portion 120 is an anode, the leadtab assembly 10 is applied to the first electrode portion 110. As described above, this is to prevent the bonding breakage due to the volume expansion of the cathode layer using the leadtab assembly 10 when using silicone as the active material. FIG. 2 illustrates the case that applies the leadtab assembly 10 to the first electrode portion 110, and a detailed description of the leadtab assembly 10 will be provided instead by the description of FIG. 1.

Figure 4:
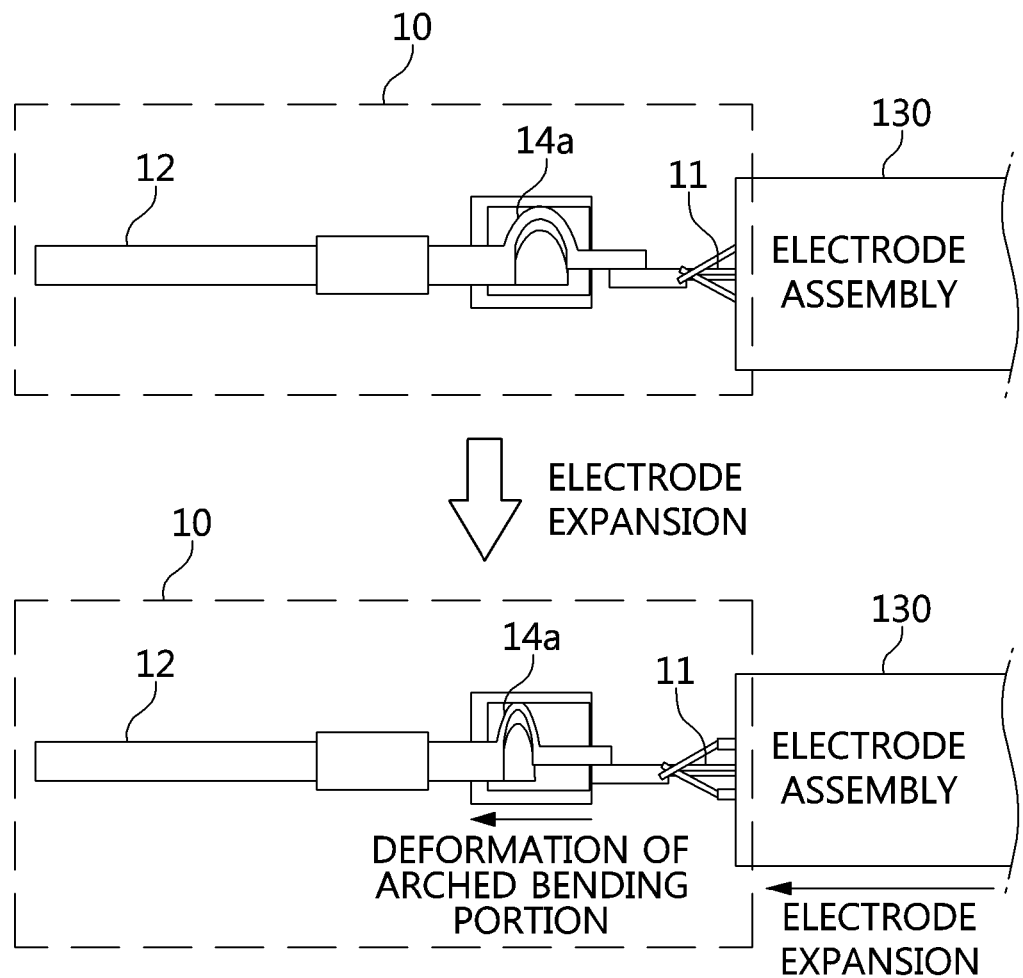
FIG. 4 is a diagram explaining a structural change of the leadtab assembly depending upon electrode expansion.

FIG. 4 is a diagram illustrating a structural change of the leadtab assembly depending upon the electrode expansion.

Herein, the electrode expansion occurs if silicon series are used as the cathode active material of the electrode assembly 130. In the instant case, the volume expansion occurs upon charging, and thereby the electrode expansion of a maximum of 2% can occur in the direction of the leadtab.

As such, the arched bending portion 14a of the leadtab assembly 10 minimizes the deformation of the electrode non-coating portion 11 through the bending deformation depending upon the electrode expansion to prevent the breakage of the electrode non-coating portion 11.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings.

The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A leadtab assembly, comprising:
   an electrode non-coating portion protruded to an outside of an electrode assembly having a plurality of stacked electrodes disposed inside a battery cell;
   a leadtab forming an electrical path to an outside of the battery cell;
   a bonding portion bonding the electrode non-coating portion and the leadtab; and
   a cutting prevention portion located between the leadtab and one of the bonding portion and the electrode non-coating portion, preventing a breakage of the electrode non-coating portion depending upon an electrode expansion at the bonding portion,
   wherein the cutting prevention portion includes:
      an arched bending portion formed in an arched structure which is elastically deformable by a force applied to the electrode non-coating portion when the electrodes are expanded; and
      an insulation portion located under the arched bending portion to adjust an amount of elastic deformation of the arched structure of the arched bending portion,
   wherein the arched bending portion is integrally formed with the leadtab,
   wherein the arched bending portion has thinner thickness and wider width than the leadtab, and
   wherein the insulation portion is in a semicircular shape.

2. The leadtab assembly of claim 1, wherein the bonding portion is formed by extending the electrode non-coating portion and delivers the force generated by the electrode expansion to the arched bending portion.

3. The leadtab assembly of claim 1, wherein the arched bending portion includes a first bonding extension portion bonding an end portion of the arched structure and a second bonding extension portion bonding an end portion of the leadtab.

4. The leadtab assembly of claim 3, wherein the first and second bonding extension portions are thinner than the leadtab.

5. The leadtab assembly of claim 1, wherein the arched bending portion is injection-molded into an integral structure with the leadtab.

6. The leadtab assembly of claim 1, wherein the insulation portion is polymer material.

7. The leadtab assembly of claim 1, wherein the leadtab includes a sealant of polymer material united to a side thereof for sealing the battery cell.

8. The leadtab assembly of claim 1, wherein the electrode non-coating portion is a cathode non-coating portion in which silicon series is used as a cathode active material of the electrode assembly.

9. A battery cell, comprising:
   an electrode assembly assembled by separating an actively coated anode layer and an actively coated cathode layer by a separation film layer;
   a first electrode portion and a second electrode portion for forming an electrical path with a jelly roll; and
   a pouch for receiving by folding the jelly roll with a flexible sheet, wherein at least one of the first electrode portion and the second electrode portion is applied with a leadtab assembly preventing bonding breakage through elastic deformation depending upon electrode expansion of the leadtab assembly, wherein the leadtab assembly includes:
- an electrode non-coating portion protruded to an outside of the electrode assembly having a plurality of stacked electrodes disposed inside the battery cell;
- a leadtab forming an electrical path to an outside of the battery cell;
- a bonding portion bonding the electrode non-coating portion and the leadtab; and
- a cutting prevention portion located between the leadtab and one of the bonding portion and the electrode non-coating portion, preventing a breakage of the electrode non-coating portion depending upon an electrode expansion, and wherein the cutting prevention portion includes:
- an arched bending portion formed in an arched structure which is elastically deformable by a force applied to the electrode non-coating portion when the electrodes are expanded,
- an insulation portion located under the arched bending portion to adjust an amount of elastic deformation of the arched structure of the arched bending portion, and wherein the insulation portion is in a semicircular shape.

10. The battery cell of claim 9, wherein the electrode assembly is the jelly roll for forming a multi-layered structure wound while separating the actively coated anode layer, the actively coated cathode layer, and the separation film layer.

11. The battery cell of claim 9, wherein the bonding portion is formed by extending the electrode non-coating portion and delivers the force generated by the electrode expansion to the arched bending portion.

12. The battery cell of claim 9, wherein the arched bending portion is integrally formed with the leadtab.

13. The battery cell of claim 12, wherein the arched bending portion includes a first bonding extension portion bonding an end portion of the arched structure and a second bonding extension portion bonding an end portion of the leadtab.

14. The battery cell of claim 13, wherein the first and second bonding extension portions are thinner than the leadtab.

15. The battery cell of claim 9, wherein the leadtab assembly is applied to the first electrode portion in which silicon series is used as a cathode active material when the first electrode portion of the battery cell is a cathode.

* * * * *